(12) United States Patent
Nelson et al.

(10) Patent No.: US 8,561,390 B2
(45) Date of Patent: Oct. 22, 2013

(54) ENERGY PRODUCTION SYSTEM USING COMBUSTION EXHAUST

(76) Inventors: Rodney L. Nelson, Princeton, NC (US); Margaret A. Nelson, Princeton, NC (US); Durwood D. Woodall, Smithfield, NC (US)

( * ) Notice: Subject to any disclaimer, the term of this patent is extended or adjusted under 35 U.S.C. 154(b) by 174 days.

(21) Appl. No.: 13/350,748

(22) Filed: Jan. 14, 2012

(65) Prior Publication Data

US 2012/0186674 A1    Jul. 26, 2012

Related U.S. Application Data

(60) Provisional application No. 61/435,490, filed on Jan. 24, 2011.

(51) Int. Cl.
*F01N 5/00* (2006.01)

(52) U.S. Cl.
USPC .............. 60/281; 60/280; 60/309; 60/310; 60/318; 60/408; 60/685

(58) Field of Classification Search
USPC .......... 60/272, 280, 281, 309, 310, 311, 318, 60/408, 412, 685
See application file for complete search history.

(56) References Cited

U.S. PATENT DOCUMENTS

| | | | | |
|---|---|---|---|---|
| 2,829,501 | A * | 4/1958 | Walls ........................... | 60/659 |
| 4,984,426 | A * | 1/1991 | Santi ........................... | 60/281 |
| 6,286,315 | B1 * | 9/2001 | Staehle ........................ | 60/649 |
| 6,901,743 | B2 * | 6/2005 | Asanuma et al. ............... | 60/281 |
| 7,559,977 | B2 | 7/2009 | Fleischer et al. | |
| 8,151,553 | B1 * | 4/2012 | Schechter ..................... | 60/279 |
| 8,234,868 | B2 * | 8/2012 | Bollinger et al. .............. | 60/682 |
| 8,387,375 | B2 * | 3/2013 | Blieske ........................ | 60/408 |

* cited by examiner

*Primary Examiner* — Binh Q Tran
(74) *Attorney, Agent, or Firm* — Louis Ventre, Jr.

(57) ABSTRACT

An energy production and pressurized exhaust gas storage system including two combustion chambers aligned in opposition to each other, each of the two combustion chambers having a reciprocating power piston. A compression chamber is situated between the two combustion chambers and it includes a reciprocating compression piston. A shaft connects all of the pistons together. A solvent tank is connected to the two combustion chambers to receive the exhaust gas carbon dioxide. The solvent is preferably water maintained at about 32 degrees Fahrenheit and with a pressure above the water surface of about 100 pounds per square inch. Upon combustion, a pressurized carbon dioxide storage chamber receives compressed carbon dioxide from the compression chamber. Check valves are used to enable inflow of carbon dioxide to the compression chamber from the solvent tank and outflow of pressurized carbon dioxide in the compression chamber to storage.

5 Claims, 4 Drawing Sheets

ENERGY PRODUCTION SYSTEM USING COMBUSTION EXHAUST

CROSS-REFERENCE TO RELATED APPLICATION

This application claims the benefit of U.S. Provisional Application No. 61/435,490, filed 24 Jan. 2011, which is hereby incorporated by reference herein.

TECHNICAL FIELD

In the field of power plants, a combustion system processes having means to generate combustion products, whereby these combustion products are usable to perform useful work.

SUMMARY OF INVENTION

An energy production and pressurized exhaust gas storage system including two combustion chambers aligned in opposition to each other, each of the two combustion chambers having a reciprocating power piston. A compression chamber is situated between the two combustion chambers and it includes a reciprocating compression piston. A shaft connects all of the pistons together so that they move as a unit. A solvent tank is connected to the two combustion chambers to receive the exhaust gas carbon dioxide. The solvent is preferably water maintained at about 32 degrees Fahrenheit and with a pressure above the water surface of about 100 pounds per square inch. Upon combustion, a pressurized carbon dioxide storage chamber receives compressed carbon dioxide from the compression chamber. Check valves are used to enable inflow of carbon dioxide to the compression chamber from the solvent tank and outflow of pressurized carbon dioxide in the compression chamber to the pressurized carbon dioxide storage chamber.

The system may include an inflow diversion valve to shut off the carbon dioxide flow and allow inflow to the compression chamber of another fluid, such as atmospheric air. In this case, a pressure diversion valve is connected between the compression chamber and the pressurized carbon dioxide storage chamber in order to divert the other fluid to a pressurized second fluid storage chamber.

To control the temperature and pressure within the solvent tank, the system may further include a reheat storage chamber connected to the solvent tank.

Technical Problem

A new method is needed for producing and storing energy from combustion in order to make it instantaneously available when needed to power machines or refrigeration equipment. For example, presently high priced refrigerants are used to transform geothermal and solar heat energy to generate electricity and must function in a closed system. These refrigerants are compounds with physical limits, whereas carbon dioxide is a natural gas with much more favorable attributes for this purpose.

Solution to Problem

A preferred embodiment combusts carbon and many of its compounds, solutions and mixtures with oxygen. Using the energy from the reaction to compress and store the resultant products and other outside fluids for utilization as kinetic energy and/or feedstock for commercial products. Preferred embodiments of the device are adapted to simultaneously pressurize multiple fluids to supply energy to various engines, tools, equipment and machines. There are no limits as to size or power from the invention. Carbon dioxide can be mildly acidic and corrosive to ferrous materials and some polymers, and this can be avoided where direct contact is expected.

Advantageous Effects of Invention

The process delivers peak advantages when combustion takes place using oxygen with sulfur free propane and other hydrocarbons as a fuel. Fuels that have other elements than hydrogen and carbon are treated in a solvent treatment tank so that carbon dioxide predominates. Oxygen reacts with carbon and many of its combinations, generating energy in several forms, which is transformed to kinetic energy. Hydrocarbon fuels detonate violently when ignited, preferably in the presence of a stoichiometric quantity of oxygen. The simplicity of this power plant absorbs and mitigates this potentially destructive force by transforming the heat energy to work through expansion.

BRIEF DESCRIPTION OF DRAWINGS

The drawings show preferred embodiments of the combustion system or its operating parameters and the reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

Figure 1:
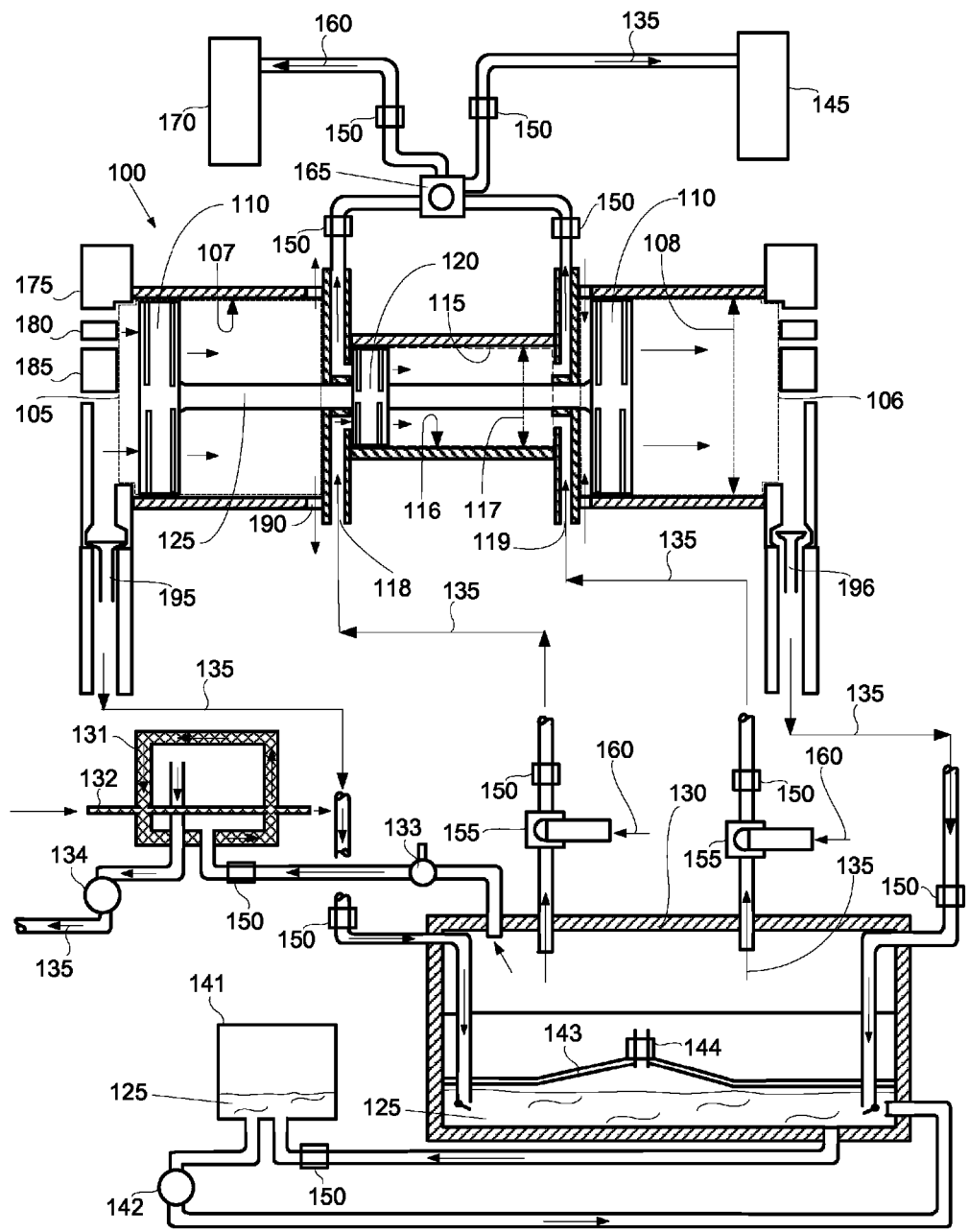
FIG. 1 is a general arrangement of the combustion system.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention. All temperatures and pressures stated in the drawings and herein should not be considered precise values but are approximately the values stated.

FIG. 1 shows an energy production and pressurized exhaust gas storage system (100) in accordance with the teachings herein. There are two combustion chambers aligned in opposition to each other, each of the two combustion chambers, a first combustion chamber (105) and a second combustion chamber (106). These two combustion chambers are represented by the dashed enclosures with those reference numbers in FIG. 1.

Each combustion chamber has a first wall (107) preferably defining a right circular cylindrical chamber having a first diameter (108). The first combustion chamber (105) and a second combustion chamber (106) are preferably defined by a diameter, which is preferably the same diameter, and is represented by the first diameter (108). In alternative embodiments, the diameter of the first combustion chamber (105)

and a second combustion chamber (106) may be different from each other, depending on the desired resulting pressure of compressed carbon dioxide or other fluids.

The first combustion chamber (105) and a second combustion chamber (106) each have a power piston (110). As with a typical engine, the power piston (110) slidably engages the first wall (107) of one of the two combustion chambers and is able to reciprocate therein as a result of alternative combustion of the fuel in the first combustion chamber (105) and the second combustion chamber (106). Thus, the first combustion chamber (105) and a second combustion chamber (106) are preferably alternatively and continuously ignited to cause continuous reciprocation of the power piston (110) in each such combustion chamber.

The energy production and pressurized exhaust gas storage system (100) includes a compression chamber (115) situated between the first combustion chamber (105) and the second combustion chamber (106). As with the combustion chambers, the compression chamber (115) is preferably a right circular cylindrical chamber and thus includes a second wall (116) having a second diameter (117). Depending on the volume or pressure desired, the second diameter (117) may be the same, larger or smaller than the first diameter (108).

A compression piston (120) is situated within the compression chamber (115). Similarly to each power piston (110), the compression piston (120) slidably engages the second wall (116) and is able to reciprocate within the compression chamber (115).

The energy production and pressurized exhaust gas storage system (100) includes a shaft (125) connecting each power piston and the compression piston (120) so that the compression piston and both power pistons reciprocate as a unit.

The energy production and pressurized exhaust gas storage system (100) includes a solvent tank (130) that is flowably connected to the first combustion chamber (105) on the left side of FIG. 1 and to the second combustion chamber (106) on the right side of FIG. 1. The two combustion chambers are thus flowably connected such that carbon dioxide (135) from combustion is exhausted to the solvent tank (130).

The solvent tank (130) includes a solvent (140) capable of dissolving the carbon dioxide (135). The preferred solvent is water at a temperature of 32 degrees Fahrenheit and a pressure immediately above the surface at 100 pounds per square inch. Other exemplary solvents include an amine or amino acid solution or an inorganic aqueous solution such as a carbonate solution, which can absorb relatively large amounts of carbon dioxide (135) at high pressure and high partial pressure of carbon dioxide (135). A separating barrier (143) above the solvent (140) surface within the solvent tank (130) permits two different pressures within the solvent tank (130). The separating barrier (143) preferably includes reheat element that increases the temperature and pressure of any free carbon dioxide from any temperature and pressure, forcing the separated carbon dioxide through the check valve feeding the reheat storage chamber (131). Above the separating barrier (143) the carbon dioxide pressure is preferably 580 pounds per square inch. A pressure control valve (144) enables pressure control of the lower pressure above the solvent (140).

A solvent treatment tank (141) may be added to better regulate the amount of solvent (140) into and out of the solvent tank (130). When a fuel is used that contains elements other than hydrogen and carbon, the solvent treatment tank scrubs out the undesirable combustion products. A circulating pump (142) and check valve (150) permit movement of the solvent (140) into and out of the solvent tank (130).

The energy production and pressurized exhaust gas storage system (100) may optionally include a reheat storage chamber (131) flowably connected to the solvent tank (130) and preferably connected to access the higher pressure volume within the solvent tank (130) above the separating barrier (143). The connection pipe preferably includes a pressure relief valve (133) and a check valve (150). Pressure within the reheat storage chamber (131) is preferably about 1,000 pounds per square inch. A line from the reheat storage chamber (131) with a pressure regulator (134) may be used as a supplemental compressed carbon dioxide production port. A heat source (132) within the reheat storage chamber (131) provides the means to control temperature and pressure of carbon dioxide flowing from the solvent tank (130). Carbon dioxide extracted from this production port is preferably in a pressure range of 100 to 900 pounds per square inch.

The energy production and pressurized exhaust gas storage system (100) includes a pressurized carbon dioxide storage chamber (145) flowably connected to the compression chamber (115). This chamber may be a simple storage tank or a second solvent tank system separate and apart from the solvent tank (130).

The energy production and pressurized exhaust gas storage system (100) includes a plurality of check valves (150) that enable inflow of carbon dioxide (135) to the compression chamber (115) from the solvent tank (130) and outflow of carbon dioxide (135) pressurized in the compression chamber (115) to the pressurized carbon dioxide storage chamber (145).

The energy production and pressurized exhaust gas storage system (100) may optionally include an inflow diversion valve (155) that is flowably connected between the solvent tank (130) and the compression chamber (115). This inflow diversion valve (155) is also connected to a second fluid (160) for inflow to the compression chamber as an alternative to carbon dioxide (135) inflow. This enables the system to compress other fluids, such as air, if so desired.

The energy production and pressurized exhaust gas storage system (100) may optionally include a pressure diversion valve (165) that is flowably connected between the compression chamber (115) and the pressurized carbon dioxide storage chamber (145). This pressure diversion valve (165) is also connected to a pressurized second fluid storage chamber (170). This enables the second fluid (160), such as air obtained from the atmosphere, to be stored separately from the compressed carbon dioxide.

EXAMPLE 1

To illustrate operation of the energy production and pressurized exhaust gas storage system (100), reference is made to FIG. 1 with the assumption that that the pistons are in a first position. An oxygen injector (175) injects oxygen, a fuel injector (180) also injects a hydrocarbon fuel, and an igniter (185) initiates combustion in the first combustion chamber (105), which sends the power piston (110) in that chamber from the left to the right. The compression piston (120) also moves from the left to the right and the power piston (110) in the second combustion chamber (106) also moves from the left to the right because these pistons are all rigidly connected together by the shaft (125). A relief port (190) on the right side of the first combustion chamber (105) enables the power piston therein to move to the right without pressure resistance and exhaust any air within. A similar relief port is in the second combustion chamber (106) on the left side and it permits air to enter the second combustion chamber (106) to the left of the compression piston (120) therein.

When the fuel ignites in first combustion chamber (105), the first exhaust valve (195) closes so that the combustion gases push the power piston (110) in that first combustion chamber (105) to the right. A second exhaust valve (196) in the second combustion chamber (106) opens to permit previously combusted exhaust to exit to the solvent tank (130). The pressure of the combusted gas is preferably over 100 pounds per square inch. Ideally, this pressure should be less than 120 pounds per square inch but could be much higher. Carbon dioxide (135) solubility decreases from a maximum ratio of 1.8:1 at 32 degrees Fahrenheit and 100 pounds per square inch.

In the compression chamber (115), the movement of the compression piston (120) to the right, compresses carbon dioxide exhaust gases within the compression chamber (115). The carbon dioxide exhaust gases exit at the top right of the compression chamber (115) through a check valve (150) that opens to permit flow of the compressed carbon dioxide (135) to storage in a pressurized carbon dioxide storage chamber (145). A preferred pressure of the carbon dioxide (135) from the compression chamber is about 600 pounds per square inch.

At the same time of movement of the compression piston (120) to the right, carbon dioxide (135) from the solvent tank (130) is drawn into the compression chamber (115) through another check valve (150) and through first compressor intake port (118). This charge of carbon dioxide (135) will be compressed when the second combustion chamber (106) ignites fuel and begins to move the power piston (110) therein to the left. A second compressor intake port (119) provides the same function within the second combustion chamber (106).

In an alternative embodiment, the compression piston (120) sucks in a second fluid (160), such as air, through an inflow diversion valve (155), one for each side of the compression piston (120) and expels it at elevated pressure through a pressure diversion valve (165) on its return stroke. This arrangement enables the pressurization and storage of not only carbon dioxide but of the second fluid (160), such as atmospheric air, that can be utilized to drive any pumps or functions to assure continuity of the operation.

EXAMPLE 2

In this example, oxygen and a clean hydrocarbon fuel, such as propane, are used. The combustion products are then primarily liquid water and carbon dioxide vapor. These are exhausted into the solvent tank (130) containing a solvent (140), such as water, in which carbon dioxide is highly miscible. This solvent is maintained at 32 degrees Fahrenheit and a pressure of around 100 pounds per square inch, which are the optimum conditions to dissolve carbon dioxide in a solvent at a volume ratio of 1.8 of carbon dioxide to 1 of solvent (140) to form a charged solvent. If this charged solvent is passed to a third chamber of greater volume and reduced pressure, the dissolved carbon dioxide will separate from the solvent, is passed through a check valve into the reheat storage chamber (131) and assumes physical properties of 560 pounds per square inch at 32 degrees Fahrenheit. The added re-heat to 75-87 degrees Fahrenheit, depending on the desired working pressure up to 1,000 pounds per square inch. The flow is continuous and controlled by temperature by a processor.

EXAMPLE 3

Heat energy from a detonation (205) drives a compressor (210) designed to selectively pressurize fluids resulting from the reaction or from other sources. All hydrocarbon combinations, when reacted with a stoichiometric quantity of oxygen, produce carbon dioxide ($CO_2$) and water ($H_2O$). Combustion of hydrocarbon fuels produces a preponderance of these fluids at temperatures and pressures much above their respective critical points. When allowed to perform work these temperatures and pressures diminish first to that of water (705 degrees Fahrenheit (F) and 3200 pounds per square inch (psi)) and continue to do work beyond that of carbon dioxide (80 degrees Fahrenheit and 1000 pounds per square inch).

The physical properties of carbon dioxide are well known, mainly employed in the heating, ventilation and air conditioning (HVAC) industry, where its high pressure at modest temperature presents design problems. One problem is to achieve a desired effect for heat engine designers. Where their goal is to conserve and retain a refrigerant in a closed system, an objective of the energy production and pressurized exhaust gas storage system (100) is to conserve energy, even at the expense of acceptable loss of carbon dioxide, which is minimized by recycling. One of the unique physical qualities of carbon dioxide is the fact that liquid and vapor co-exist in various proportions at a specific temperature/pressure. While their density are equal at 87.9 degrees Fahrenheit and 1056 psi, the density of the liquid increases as the temperature/pressure decreases to −69 degrees Fahrenheit and 60 psi.

Figure 2:
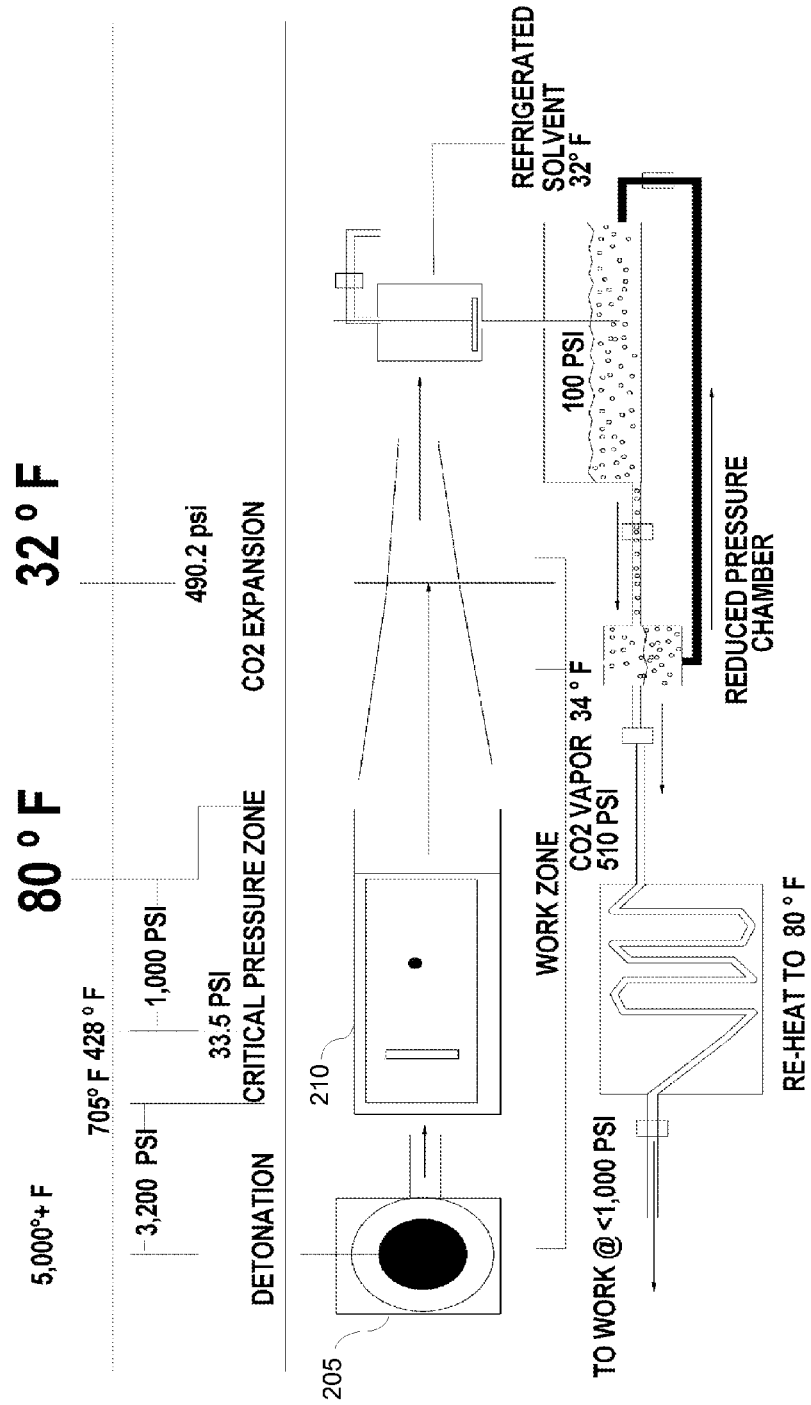
FIG. 2 is a representational plot of the temperatures and pressures within the combustion system.

As shown in FIG. 2, at 32 degrees Fahrenheit, carbon dioxide vapor pressure is 490.2 pounds per square inch, yet when dissolved in water at 32 degrees Fahrenheit, this pressure becomes 100 psi. This phenomenon simulates a phase change, bypassing the otherwise extreme temperature/pressure changes that would normally occur in continued expansion of the vapor.

The pressure of carbon dioxide remains constant at a constant temperature in the reheat storage chamber (131), where the temperature and pressure are constantly maintained much above the desired working pressure, resulting in any temperature/pressure loss occurring in the reheat storage chamber (131), not at the exhaust, after the work is performed and reconciled by additional heat added in the reheat storage chamber (131). This re-heat completes the cycle, as working pressures at close to 1,000 pounds per square inch is constant as heat demand of 80 degrees Fahrenheit, are provided from any heat source (132) such as electric inductive heaters (414), ambient atmosphere, solar, geothermal, combustible waste or any practical external heat source.

EXAMPLE 4

A preferred embodiment of the device includes one or more of a diversion valves, a temperature sensor, a pressure sensor and an electronic processor.

These diversion valves are located on the intake side of the compressor to selectively divert a fluid to be compressed. Another diversion valve is configured to send the fluid to the appropriate storage chamber. These diversion valves are preferably operated by the electronic processor, which acquires data from the sensors monitoring pressure and temperature at strategic points in the chambers and also operates and regulates the required heat to maintain the desired working pressure.

It is important to note that for carbon dioxide (135) to be utilized as a working fluid, it should preferably be provided at a reasonably constant pressure when doing work. Unlike many other vapors, carbon dioxide reacts to pressure/temperature changes in a very narrow range. The energy production and pressurized exhaust gas storage system (100) should be configured to provide that constant pressure for application to the work and is reconciled in the cycle. As a volume of carbon dioxide is drawn from the solvent tank (130) to do work at a regulated pressure, the expected temperature/pressure drop that would normally occur (at the exhaust not in the storage chamber) is compensated for by a simultaneous addition of heat to the solvent tank (130), preferably through the reheat element in the separating barrier (143).

In an alternative embodiment, carbon compounds are oxidized externally and collected and pressurized by addition of a combustion chamber and a compressor, both of which require energy sources, with the attendant loss of efficiency.

EXAMPLE 4

Figure 4:
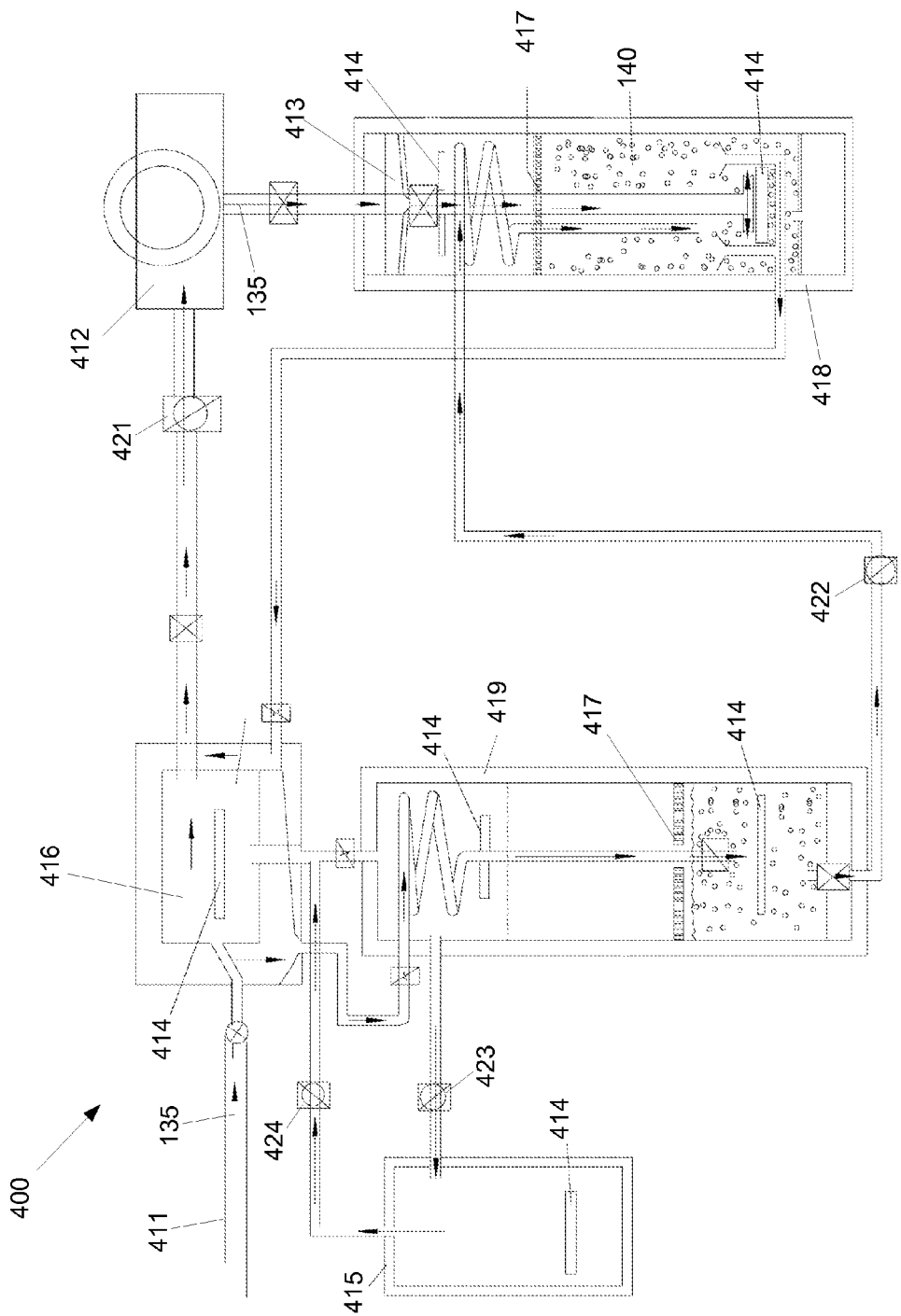
FIG. 4 is an alternative pressurized carbon dioxide storage chamber receiving output from the compression chamber.

This example illustrates a high pressure carbon dioxide storage and utilization system (400) that receives the output from the energy production and pressurized exhaust gas storage system (100) starting at a high pressure input line (411) as shown in FIG. 4. This system produces energy using the ICE and Flywheel Power Plant, also known as the Nelson Engine (412) and described in U.S. Pat. No. 7,481,195, which is incorporated by reference herein.

Heat engines presently function on expanding hot gases, rotating a shaft either by a crankshaft or a turbine. In piston/crankshaft engines maximum energy is created at detonation and diminishes as expansion occurs and is limited by the throw on the crank, which is determined by the compression ratio and only rotates the shaft ½ turn per power stroke. This limited expansion detracts from the thermal efficiency resulting in wasted heat energy. This invention, when applied to the Nelson Engine (412), provides constant pressure on the piston throughout the power stroke rotating the shaft multiple times, dependant only on the desired length of the power stroke.

Figure 3:
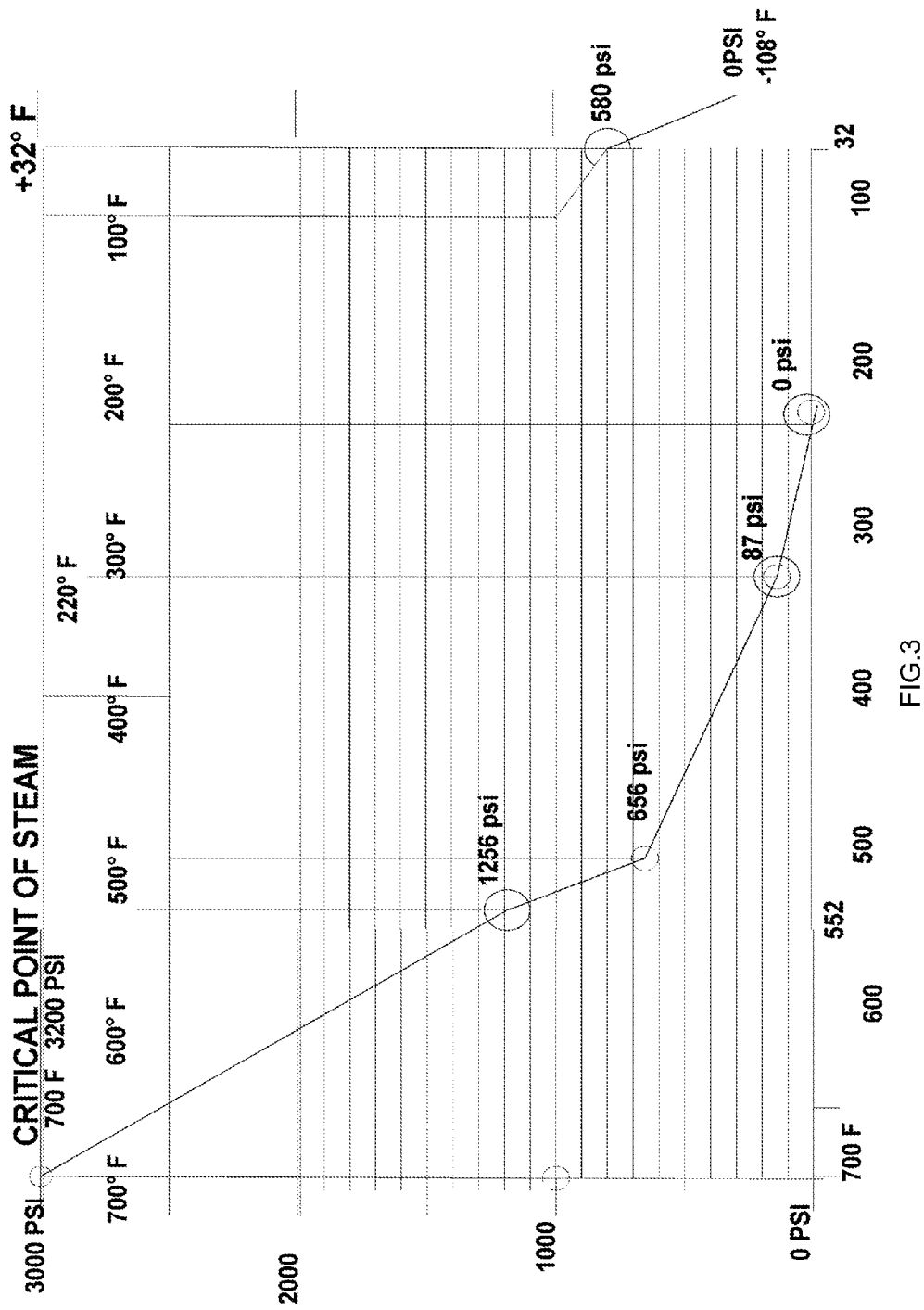
FIG. 3 is a plot of carbon dioxide temperature versus pressure in the combustion system.

FIG. 3 is a plot of carbon dioxide temperature versus pressure in the combustion system in relation to the critical point of steam. The critical point of carbon dioxide is 87.80 degrees Fahrenheit at 1067.47 psi. Above this temperature only vapor exists. At a higher temperature, the pressure increases accordingly; at a lower pressure and temperature both liquid and vapor co-exist in proportions dependent upon the descending degree of 80 degrees Fahrenheit to minus 69.88 degrees Fahrenheit. Liquid carbon dioxide at 32 degrees Fahrenheit is 9 times more dense.

To avoid confusion in this context, carbon dioxide vapor and liquid have distinct physical properties from carbon dioxide dissolved in a solution, i.e. a solvent. The maximum volume of dissolved carbon dioxide vapor is 1.8 of the solvent volume at 32 degrees Fahrenheit and 100 psi. Carbon dioxide is miscible in solvents. In water, the ratio is 1.8 carbon dioxide to 1 volume of water when at a temperature of 32 degrees Fahrenheit and a pressure of 100 psi.

The high pressure carbon dioxide storage and utilization system (400) is preferably a hermetically sealed system. A Programmable Logic Controller controls the process. Carbon dioxide (135) is stored in expansion chamber (415) and high pressure, enclosed re-heat chamber (416) at above 90 degrees Fahrenheit and 1100 pounds per square inch (psi). When the expansion chamber (415) and high pressure, enclosed re-heat chamber (416) reach an operating pressure, then carbon dioxide is fed through a second programmable shut-off solenoid valve (422) to the Nelson Engine (412), which rotates a flywheel, then exhausts the carbon dioxide (135) at the same pressure and temperature as the inlet values (90 degrees Fahrenheit at 600-1000 psi) into the solvent diffuser (418), where a pressure and temperature change takes place in the storage chamber not at the work expansion. Expansion occurs when the driven piston reverses it becomes a compressor, forcing the accumulated fluids into the solvent diffuser (418), which is an expansion chamber. This constant pressure and temperature is an important distinction from a combustion cycle, where the pressure decreases through an expansion (power) cycle.

The Nelson Engine (412) cycle is reversed as its compressor piston reaches end of stroke. The pressurized exhaust is forced, through a check valve into a chamber of greater volume, allowing carbon dioxide vapor to expand and assume its ratio of vapor: liquid at a reduced pressure and temperature (32 degrees Fahrenheit/490 psi) This chamber preferably has a concave bottom that allows the more dense liquid to collect and be forced through the check valve, to diffuse into the solution, which is maintained at 32-36 degrees Fahrenheit.

The unique physical properties of carbon dioxide (its miscibility in a water solvent). This phenomenon is nearly the equivalent of a phase change. Pure water at these pressure and temperature conditions (32 degrees Fahrenheit at 100 psi) dissolve 1.8 volume of carbon dioxide vapor per volume and remains dissolved until affected by increased temperature or decreased pressure. Under either change, the carbon dioxide will separate from the solution and assume the relative pressure and temperature of the vapor (at about 32 degrees Fahrenheit the vapor pressure is about 490 psi at about 36 degrees Fahrenheit the pressure is about 520 psi).

The solvent diffuser (418) is constructed to contain a specific volume of solvent (140), with a calculated expansion volume (413) filled with carbon dioxide vapor at less than 100 psi. Continued input of the exhaust cycle at the regulated pressure (600-800 psi) until the maximum carbon dioxide vapor is absorbed. Heat application is ceased in the storage chamber and both shut off valves (first programmable shut-off solenoid valve (421) and second programmable shut-off solenoid valve (422)) are in off position and simultaneously applied in the void of the diffuser, raising the pressure until the charged solution is transferred to the receptor (419).

This increased pressure and temperature forces the charged solvent (140) to circulate through the receptor (419) at about 32 degrees Fahrenheit, which cools the high pressure, enclosed re-heat chamber (416) and the receptor (419), creating a reduced pressure in the receptor (419). Additional heat in the solvent diffuser (418) raises the pressure and temperature until equilibrium of the pressure and temperature in the solvent diffuser (418) and receptor (419) is reached and the charged solvent (140) transfer is accomplished.

Heat input is now removed in the solvent diffuser (418) and now applied in the lower part of the receptor (419) at about 32 degrees Fahrenheit. Both shut off valves (first programmable shut-off solenoid valve (421) and second programmable shut-off solenoid valve (422)) are in off position and third programmable shut-off solenoid valve (423) is opened, allowing expansion of the separated vapor in chamber, lowering pressure and temperature to about 32 degrees Fahrenheit in expansion chamber (415), the vapor pressure is about 490 psi, continued heat in the receptor (419) and expansion chamber (415) extracts the vapor from the solvent (140), transferring the vapor to high pressure, enclosed re-heat chamber (416). When solvent (140) is depleted, three valves are closed. These three valves are first programmable shut-off solenoid valve (421), third programmable shut-off solenoid valve (424) and fourth programmable shut-off solenoid valve (424). The second programmable shut-off solenoid valve (422) is opened, allowing the reversal of the transfer process. The described high pressure carbon dioxide storage and utilization system (400) provides a system that can be programmed to supply pressurized carbon dioxide to power engines or machines.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the power production industry.

What is claimed is:

1. An energy production and pressurized exhaust gas storage system comprising:
    two combustion chambers aligned in opposition to each other, each of the two combustion chambers comprising a first wall having a first diameter;
    a power piston within each of the two combustion chambers, each power piston slidably engaging the first wall of one of the two combustion chambers and able to reciprocate therein;
    a compression chamber situated between the two combustion chambers, the compression chamber comprising a second wall having a second diameter;
    a compression piston within the compression chamber, the compression piston slidably engaging the second wall of one of the compression chambers and able to reciprocate therein;
    a shaft connecting each power piston and the compression piston so that the compression piston and both power pistons reciprocate as a unit;
    a solvent tank flowably connected to the two combustion chambers such that carbon dioxide from combustion is exhausted to the solvent tank, the solvent tank comprising a solvent capable of dissolving the carbon dioxide;
    a pressurized carbon dioxide storage chamber flowably connected to the compression chamber; and
    a plurality of check valves enabling inflow of carbon dioxide to the compression chamber from the solvent tank and outflow of carbon dioxide pressurized in the compression chamber to the pressurized carbon dioxide storage chamber.

2. The energy production and pressurized exhaust gas storage system of claim 1, further comprising:
    an inflow diversion valve flowably connected between the solvent tank and the compression chamber, and the inflow diversion valve further connected to a second fluid for inflow to the compression chamber; and
    a pressure diversion valve flowably connected between the compression chamber and the pressurized carbon dioxide storage chamber, and the pressure diversion valve further connected to a pressurized second fluid storage chamber.

3. The energy production and pressurized exhaust gas storage system of claim 2, wherein the second fluid is atmospheric air.

4. The energy production and pressurized exhaust gas storage system of claim 1, further comprising a reheat storage chamber flowably connected to the solvent tank, where temperature and pressure of carbon dioxide are controlled.

5. The energy production and pressurized exhaust gas storage system of claim 1, wherein the solvent is water maintained at about 32 degrees Fahrenheit and with a pressure of about 100 pounds per square inch.

* * * * *